United States Patent Office 3,424,562
Patented Jan. 28, 1969

3,424,562
SEPARATING ALKALI METAL HALATES FROM HALIDES BY ADDITION OF A WATER-SOLUBLE ALCOHOL
Remigius A. Gaska and Robert D. Goodenough, Midland, Mich., assignors to The Dow Chemical Company, Midland, Mich., a corporation of Delaware
No Drawing. Filed Apr. 8, 1966, Ser. No. 541,062
U.S. Cl. 23—296          10 Claims
Int. Cl. B01d 9/02; B01j 17/06; C01b 7/00

This invention relates to a method of separating halate salts from aqueous solutions containing halide salts, and more particularly pertains to the separation of alkali metal halates whose solubility in water on a weight basis is not as great as that of the corresponding halide in water, from aqueous solutions containing these salts by adding sufficient amount of alcohol to selectively precipitate a major proportion of the halate salt and, at most, only a small proportion of the halide salt and separating the precipitate from the mixture.

Prior to this invention, alkali metal halates of the type defined were separated from the corresponding halides by concentrating aqueous solutions until they were substantially saturated with the halide. The precipitate of the halate salts which forms on cooling the aqueous solution is either contaminated with considerable amount of halide salt or if the halate salt precipitate is comparatively pure, a fairly large amount of the halate salt remains in solution. To make a satisfactory halate salt requires either recrystallization of the contaminated product or low initial recovery because of excessive loss in the mother liquor.

According to this invention, a water-soluble alcohol is added to an aqueous mixture of an alkali metal halate and alkali metal halide. All the halide salt should be in solution. The amount of alcohol added can range between 10–50% by weight of the combined weight of alcohol and water. The preferred range is from about 15–30% by weight of the combined weight of the salt solution and alcohol. The alkali metal halate can all be in solution or some of it can be present as a precipitate. It is preferred to have aqueous solution near its saturation point in respect to the alkali metal halate.

The alcohols which can be employed include water-soluble monohydric or polyhydric saturated alcohols. Representative alcohols include methanol, ethanol and the propanols, ethylene glycol, propylene glycol, butylene glycol, glycerol, pentaerythritol, erythritol, sorbitol and mannitol and mixtures thereof.

A temperature of 0–50° C. can be employed, but preferably a temperature of 15–30° C. is used, because no external heating or cooling is needed in this operating range.

The salt pairs that can be employed are:

| | |
|---|---|
| LiI | LiIO$_3$ |
| NaI | NaIO$_3$ |
| NaBr | NaBrO$_3$ |
| KCl | KClO$_3$ |
| KBr | KBrO$_3$ |
| KI | KIO$_3$ |
| RbCl | RbClO$_3$ |
| RbBr | RbBrO$_3$ |
| RbI | RbIO$_3$ |
| CsCl | CsClO$_3$ |
| CsBr | CsBrO$_3$ |
| CsI | CsIO$_3$ |

The preferred alcohols are methanol and ethanol, because they can be readily recovered from the filtrate and recycled to the precipitation system. Most preferred is methanol because of its lower boiling point and easy separation from the mother liquor.

Although the invention is described by reference to batch operation, it is apparent that it can be readily adapted to a continuous system by use of known metering devices for controlling proportions of fluids that are fed to a continuous separator system.

The examples which follow are intended to illustrate but not to limit the invention. In all instances, parts and percentages are given by weight unless otherwise specifically indicated.

Example I

To 200 parts of a solution containing 23.8 parts NaBrO$_3$, 81.8 parts NaBr, and 94.4 parts water, were added 86 parts ethylene glycol. The mixture was held overnight (about 16 hours) at 25° C. and then filtered. Twenty-three parts of solids were obtained. On analysis, the solids were found to contain 93.6% by weight NaBrO$_3$, and the remainder about equally divided between solvent and NaBr. On washing with water, essentially 100% pure NaBrO$_3$ was obtained.

The filtrate was found to contain 0.15% NaBrO$_3$, 30.4% NaBr, 32.7% ethylene glycol and the remainder was water.

For comparative purposes, 100 parts of a solution containing 12 parts NaBrO$_3$, 40 parts NaBr and 48 parts of water was heated to about 96° C. under reflux until all solids were in solution and then cooled to 25° C. On standing at the latter temperature for 16 hours, 13.4 parts of solid were recovered. These analyzed 83.9% NaBrO$_3$, 7.7% NaBr and 8.4% H$_2$O. The filtrate contained 4% NaBrO$_3$, 45% NaBr and 51% water.

Example II

To 100 parts of a solution containing 11.9 parts NaBrO$_3$, 40.9 parts NaBr and 47.2 parts water were added 43 parts methanol at 25° C. After allowing the mixture to reach a steady state condition, the mixture was filtered. 12.2 parts of crystals were obtained. These contained 94% NaBrO$_3$, 2.8% NaBr, and 3.2% solvent. On washing the crystals with methanol, essentially 100% NaBrO$_3$ was obtained.

The methanol from the filtrate can be distilled, leaving an aqueous solution containing 46.2% NaBr, 0.8% NaBrO$_3$ and 53% water.

Example III

To a solution containing 3.05 parts NaIO$_3$, 20 parts NaI and the remainder water, there was added sufficient methanol to provide 17% methanol by weight based on the entire solution. The temperature was maintained at 25° C. until steady state conditions were achieved. The crystals which separated were separated from the mother liquor by filtration. It was found to contain 0.75% NaIO$_3$ and 20% NaI on a methanol-free basis.

Example IV

Sufficient methanol was added to a solution containing 1.9 parts KClO$_3$, 18 parts KCl and the remainder water, to provide 17% by weight methanol based on the entire solution. The crystals which formed were separated from the system by filtration. Analysis of the methanol-free aqueous residue, showed that it contained 0.85 part KClO$_3$, 18 parts KCl and the remainder was water.

When rubidium or cesium salt pairs are substituted for the Na and K salts, the halates of these former elements can be effectively separated from the halides. Similarly, if ethanol or isopropanol or the polyhydric alcohols are used in place of methanol or ethylene glycol, the halates of the alkali metals can be separated from the halides. However, with the polyhydric alcohols, distillation of the alcohol and recycling is difficult and for this reason, the polyols can be used with ease only in processes where recycle of solvent is not mandatory.

We claim:
1. A method of separating alkali metal halates selected from the group consisting of lithium iodate, sodium iodate, sodium bromate, potassium chlorate, potassium bromate, potassium iodate, rubidium chlorate, rubidium bromate, rubidium iodate, cesium chlorate, cesium bromate and cesium iodate from their corresponding halides, the said halates being less soluble in water than the said halides, comprising admixing an aqueous solution containing said halates and said halides with between about 10 to 50% by weight based on the combined weight of water, the dissolved salts and alcohol of a water-soluble alcohol selected from the group consisting of methanol, ethanol, propanol, ethylene glycol, propylene glycol, butylene glycol, glycerol, pentaerythritol, erythritol, sorbitol, mannitol and mixtures thereof to effect precipitation of a major proportion of the dissolved alkali metal halate and at most only a small proportion of the said alkali metal halide, and separating the precipitated alkali metal halate from the mother liquor.

2. The method of claim 1 in which the alkali metal in the salt is potassium.

3. The method of claim 1 in which the alkali metal in the salt is sodium.

4. The method of claim 1 in which the alcohol is methanol and its concentration ranges between about 10 and about 50% by weight based on the combined weight of water, the dissolved salts and alcohol.

5. The method of claim 4 in which alcohol concentration is between about 15 and about 30% on the basis defined in said claim.

6. The method of claim 1 in which the temperature during the precipitation step ranges from about 0 to about 50° C.

7. The method of claim 6 in which the temperature ranges from about 20 to about 30° C.

8. The method of claim 1 in which the halate is sodium bromate, the halide is sodium bromide and the alcohol is methanol.

9. The method of claim 1 in which the halate is sodium iodate, the halide is sodium iodide and the alcohol is methanol.

10. The method of claim 1 in which the halate is potassium iodate, the halide is potassium iodide and the alcohol is methanol.

References Cited

UNITED STATES PATENTS

| | | | |
|---|---|---|---|
| 2,496,289 | 2/1950 | Hampel | 23—85 |
| 3,231,340 | 1/1966 | Gaska | 23—302 X |
| 3,268,290 | 8/1966 | Gaska | 23—302 X |
| 3,341,287 | 9/1967 | Scribner | 23—302 X |

FOREIGN PATENTS 636,568   2/1962   Canada.

NORMAN YUDKOFF, *Primary Examiner.*

S. J. EMERY, *Assistant Examiner.*

U.S. Cl. X.R.

23—85, 300, 302